(12) United States Patent
RoyChowdhury et al.

(10) Patent No.: US 11,409,962 B2
(45) Date of Patent: Aug. 9, 2022

(54) SYSTEM AND METHOD FOR AUTOMATED INSIGHT CURATION AND ALERTING

(71) Applicant: Fractal Analytics Private Limited, Mumbai (IN)

(72) Inventors: Soudip RoyChowdhury, Kolkata (IN); Vaibhavi Joshi, Mumbai (IN); Siddhesh Pisal, Mumbai (IN); Sudarshan Wadkar, Latur (IN); Utkarsh Agarwal, Neem-ka-thana (IN)

(73) Assignee: Eugenie Technologies Private Limited, Mumbai (IN)

( * ) Notice: Subject to any disclaimer, the term of this patent is extended or adjusted under 35 U.S.C. 154(b) by 6 days.

(21) Appl. No.: 16/668,039

(22) Filed: Oct. 30, 2019

(65) Prior Publication Data
US 2021/0081501 A1   Mar. 18, 2021

(30) Foreign Application Priority Data

Sep. 17, 2019   (IN) .............................. 201921037474

(51) Int. Cl.
| | | |
|---|---|---|
| *G06N 20/00* | (2019.01) | |
| *G06N 5/04* | (2006.01) | |
| *H04L 67/10* | (2022.01) | |
| *G06F 40/30* | (2020.01) | |
| *G06F 16/2452* | (2019.01) | |
| *G06F 40/205* | (2020.01) | |
| *G06F 40/284* | (2020.01) | |
| *G06F 40/295* | (2020.01) | |

(52) U.S. Cl.
CPC ........ *G06F 40/30* (2020.01); *G06F 16/24522* (2019.01); *G06F 40/205* (2020.01); *G06F 40/284* (2020.01); *G06F 40/295* (2020.01); *G06N 5/04* (2013.01); *G06N 20/00* (2019.01); *H04L 67/10* (2013.01)

(58) Field of Classification Search
CPC ........ G06F 16/245; G06F 40/30; G06F 20/00; G06F 40/205
USPC .......................................................... 704/9
See application file for complete search history.

(56) References Cited

U.S. PATENT DOCUMENTS

| | | | |
|---|---|---|---|
| 8,175,908 B1 * | 5/2012 | Anderson | G06Q 30/0201 705/7.29 |
| 10,338,994 B1 * | 7/2019 | Xie | G06N 5/022 |
| 2009/0234720 A1 * | 9/2009 | George | G06Q 10/06398 705/7.42 |
| 2014/0282586 A1 * | 9/2014 | Shear | G06F 16/245 718/104 |

(Continued)

OTHER PUBLICATIONS

Neatu, D.F. et al., "My cloudy time machine: a scalable microservice-based platform for data processing in cloud-edge systems," 34th ACM/SIGAPP Symposium on Applied Computing (Apr. 8-12, 2019) pp. 1451-1458. (Year: 2019).*

(Continued)

*Primary Examiner* — Brian M Smith
(74) *Attorney, Agent, or Firm* — Wiley Rein LLP

(57) ABSTRACT

The invention relates to systems and methods for automated insight curation and alerting. The system generates insights from time-series data at scale using unsupervised machine learning algorithms. The system can further automate the suggested actions by signaling the actuators or middleware which ultimately executes the action.

19 Claims, 6 Drawing Sheets

(56) References Cited

U.S. PATENT DOCUMENTS

| | | | | |
|---|---|---|---|---|
| 2016/0034517 | A1* | 2/2016 | Babai | G06Q 50/02 |
| | | | | 707/688 |
| 2017/0147930 | A1* | 5/2017 | Bellala | G06N 5/04 |
| 2018/0007578 | A1* | 1/2018 | Drabeck | H04L 43/062 |
| 2018/0225166 | A1* | 8/2018 | Maya | G06F 11/3447 |
| 2018/0366114 | A1* | 12/2018 | Anbazhagan | G06F 9/44505 |
| 2019/0121714 | A1* | 4/2019 | Gross | G06K 9/00496 |
| 2019/0339688 | A1* | 11/2019 | Cella | G05B 23/024 |
| 2019/0370610 | A1* | 12/2019 | Batoukov | G06F 3/04855 |
| 2019/0372859 | A1* | 12/2019 | Mermoud | H04L 41/16 |
| 2020/0012541 | A1* | 1/2020 | Lube | H04L 67/12 |
| 2020/0133253 | A1* | 4/2020 | Huang | G05B 23/0221 |
| 2021/0067401 | A1* | 3/2021 | Abe | H04L 41/0622 |

OTHER PUBLICATIONS

Zaharia, M. et al., "Resilient Distributed Datasets: a fault tolerant abstraction for in-memory cluster computing," 9th USENIX Symposium on Networked Systems Design and Implementation (2012) 14 pp . . . (Year: 2012).*

* cited by examiner

SYSTEM AND METHOD FOR AUTOMATED INSIGHT CURATION AND ALERTING

RELATED APPLICATIONS

This application claims priority benefit of Indian Patent Application No. 201921037474, filed Sep. 17, 2019, which are incorporated entirely by reference herein for all purposes.

FIELD

The invention relates to systems and methods in the field of computer science, and in particular to the automated generation of insights from real-time data.

BACKGROUND ART

The number of events that the mobile telecom segment handles on daily basis is ever increasing. Activation and provisioning events occur daily for any of the three and half billion people who are using internet in their computers, televisions or mobile phones around the globe. Voice calls, SMS texts, internet messaging and internet connectivity have grown with the deep penetration of mobile services. Along with the basic services, value-added services such as direct2home, high-speed data, etc., add more variations, along with complexity, to the ecosystem. Companies are tasked with directing these events across and between carrier networks to ensure a seamless and efficient connection experience. From the ordering and provisioning process and supporting a worldwide subscriber base, to the number of events created during 2-4 hours per day of smartphone/internet usage, the amount of information generated that needs to be analyzed to ensure the sound operations and fiscal health of a mobile telecom carrier is enormous.

Analyzing this data at scale to derive actionable insights for businesses is a complex computational problem. Further, most of these insights are perishable and need immediate attention and action. On the other hand, business users have a limited attention span and bandwidth to prioritize and take appropriate action against these most pressing conditions for the business. Existing enterprise analytical tools such as dashboards, etc., not only pose problems with respect to scale, but analyses using these tools are largely human-driven. Accordingly, bias and lag are introduced into the decision-making process, which leads to missed signals for opportunities and threats to business.

SUMMARY OF THE INVENTION

The present invention addresses these issues by drastically shortening the data-to-action time step. With state-of-the-art machine learning algorithms and big-data processing stack, the present invention, referred to as the Eugenie Automated Insight Curation and Alerting System (with "Eugenie™" also being used in connection with other aspects, components, and elements of the present invention), can curate insights automatically, at scale and in the most efficient way without the need for a human-in-the-loop. Further, the present invention can prioritize insights based on their impact, which enables businesses to channelize their efforts on things that matter.

The present disclosure describes an automated insight curation and alerting system, which performs anomaly detection at scale for streaming data in real time or batch mode through state-of-the-art machine learning algorithms. The system utilizes a distributed computational framework and middleware to detect anomalous behavior in the data to generate actionable insights and alerts. Using condition monitoring detection and diagnostics techniques as well as prognostics models, the system calculates the health and remaining useful life of a target. This calculation is based on a series of algorithms, which are constantly in operation to ascertain the health of an Internet of Things (IoT) ecosystem, if the system finds any anomaly with respect to a normal behavior of an ecosystem, the system flags those observations as insights and alert users or changes the operation state of ecosystem automatically.

One exemplary system embodiment herein provides an automated insight curation and alerting system comprising a signal receiver, a message broker, a decision engine, and a signal sender. The signal receiver is configured to receive a real-time input signal from Internet of Things (IoT) sensors and normalize the real-time input signal into a byte stream; the message broker is configured to continuously receive the byte stream from the signal receiver and store the byte stream in a distributed manner across a Kafka™ cluster; the decision engine is configured to read the byte stream from the message broker in real time, wherein the decision engine comprises an anomaly detection module to detect anomalies in the byte stream and to generate insights; and the signal sender is configured to interpret the insights to a machine interpretable signal and relay the machine interpretable signal to a hardware stack.

A further system embodiment of the present invention provides an anomaly detection module comprising unsupervised machine learning algorithms. The anomaly detection module is configured to fetch the byte stream in a micro batched manner using windows, thereby generating a chunked signal, wherein the windows comprise windows of time-periods or windows of data frequency. The chunked signal is processed through a series of functional transformations via machine learning algorithms that detect anomalies. The functional transformations may split the stream into multiple streams and/or may join multiple streams into one stream by using a join operation. The functional transformations are implemented by a predictor, an anomaly detector, a root cause analyzer, an insight generator, a retainer and a modeling layer. The predictor is configured to take a derived feature of historical information from a previous state and a model from a previous state to predict future values of metrics based on historical patterns. The predictor is configured to generate a predicted time series and a predicted driver. The input signal is compared against the predicted time series by the anomaly detector to find and flag the anomalies, thereby generating flagged anomaly signals. The root cause analyzer examines the flagged anomaly signals by using the predicted driver and the input signal, thereby generating a numerical assessment. The insight generator transforms the numerical assessment into actionable insights. The retainer updates the derived features with the input signal from a current state to be used as input for updating the model from the previous state. The modelling layer enhances the model from the previous state by processing current state historical information. The decision engine further converts insights to an action to perform preventive maintenance for IoT devices.

An additional system embodiment herein provides a computer network to implement the automated insight curation and alerting system. The computer network comprises a Eugenie™ Datastore Layer (EDL) and a Eugenie Distributed System (EDS), wherein EDL is configured to run as a microservice for consuming the input signal and passing the input signal for further processing to EDS; and wherein EDS is built on top of Apache Hadoop™ Distributed Filesystem (HDFS) (open-source software utilities that facilitate using a computer network to solve problems involving massive amounts of data and computation) and uses Apache Spark™ (an open-source distributed general-purpose cluster-computing framework) to process the signal in memory using Resilient Distributed Datasets (RDD).

The present invention also relates to a method for automated insight curation and alerting, comprising receiving, via a signal receiver, an input signal in the form of time series from smart IoT devices;

normalizing, via the signal receiver, the input signal through density-based kernels to generate a normalized signal;

passing, from the signal receiver, the normalized signal to a message broker to store the normalized signal in a distributed manner across a Kafka™ cluster;

passing, from the message broker, the normalized signal to a decision engine comprising machine learning algorithms for forecasting;

computing, via the decision engine, a normal range for behaviors of the normalized signal;

detecting, via the decision engine, anomalies in the normalized signal;

running, via the decision engine, a predicted driver to identify a root cause of the anomalies;

generating, via the decision engine, actionable insight signals by an insight generator; and reporting, via a signal sender, the actionable insight signals with supporting information.

A further embodiment of the present invention provides a method comprising steps of predicting, via a predictor, future values of metrics based on historical patterns, wherein the predictor is configured to a predicted time series and a predicted driver;

fetching, via an anomaly detector, the normalized signal in a micro batched manner using at least one of time windows and frequency windows;

chunking the normalized signal in a micro batched manner using the time windows and the frequency windows to create a chunked signal;

comparing, via the anomaly detector, the input signal against the predicted time series to find and flag anomalies;

examining, via a root cause analyzer, the flagged anomalies by using the predicted driver and the input signal, thereby generating a numerical assessment;

transforming, via an insight generator, the numerical assessment into actionable insights;

updating, via a retainer, the derived features with the input signal from a current state to be used as input for updating the model; and enhancing, via a modelling layer, the model from the previous state by processing current state historical information;

wherein the steps are repeated for each windowed batch operation.

Another exemplary embodiment herein provides a method for enabling businesses to spot, explore, and exploit anomalies and patterns in data that have an impact via an automated insight curation and alerting system, comprising spotting most critical areas of a business by highlighting products or business units which have the most impact by comparing the product or business unit against its peers as well as its past performance and giving a comprehensive picture of business areas that are growing exceptionally well or declining abruptly;

detecting trend setting moments in businesses;

detecting anomalies in a dataset;

detecting areas of the business that will not meet target outcomes;

detecting significant changes in a business mix signaling underlying change in business dynamics;

detecting significant changes in the concentration of the business;

identifying important milestones such as new highs/lows in the business;

detecting changes in trends on critical business metrics; and detecting unexpected null value in business data;

wherein the anomalies comprise items, events and observations that do not conform to an expected pattern or other items.

Advantageous Effects of the Invention

The present system combines middleware that supports real-time data staging and processing of stream data to detect anomalous signals, alert the user about those anomalous incidents and can automate the change in operational state of IoT devices that produce those signals based on operational strategies or rules. The state-of-the-art suite of unsupervised algorithms enable the system to remove human bias from decision making and scale across highly complex data processing requirements.

The smart algorithms of the present invention can drill down into each insight to explore root causes for the anomalous behavior observed in the data by searching for correlations across other events that had occurred around the same time. This root cause analysis further enables the system to recommend corrective actions to the user by simulating various scenarios and finding the optimal solution to rectify the anomalous behavior.

The present system can directly interact with other systems under observation to achieve desired operational state based on the generated actionable insights.

Finally, the present system can take into account real world scenarios and business context to filter and enrich the detected anomalies to show highly impactful and actionable insights to the user. The present invention's decision engine further automates actions directed by human agents as a follow-up of the insights and apply those on the system on behalf of the human.

BRIEF DESCRIPTION OF THE DRAWINGS

The invention will be described in more detail below on the basis of one or more drawings, which illustrates exemplary embodiments.

DETAILED DESCRIPTION OF THE EMBODIMENTS

It should be understood that this invention is not limited to the particular methodology, protocols, and systems, etc., described herein and as such may vary. The terminology used herein is for the purpose of describing particular embodiments only and is not intended to limit the scope of the present invention, which is defined solely by the claims.

As used in the specification and appended claims, unless specified to the contrary, the following terms have the meaning indicated below.

"Time Series Analysis" refers to methods for analysing time series data to extract meaningful statistics and other characteristics of the data.

"Anomaly" refers to data points which do not conform to an expected pattern of the other items in the data set.

"Outliers" refer to a rare chance of occurrence within a given data set. In Data Science, an Outlier is an observation point which is distant from other observations. An Outlier may be due to variability in the measurement or it may indicate experimental error.

"Deep learning" refers to a subfield of machine learning concerned with algorithms inspired by the structure and function of the brain called artificial neural networks.

"Natural language generation (NLG)" refers to the use of artificial intelligence (AI) programming to produce written or spoken narrative from a dataset.

"Unsupervised machine learning (ML)" refers to unsupervised machine learning algorithms that gather patterns from a dataset without reference to known, or labelled outcomes.

"Kafka™" is a message queue reimaged as a distributed commit log. Messages are not deleted when consumed but are all kept on the broker (like a log file keeps line items one after another).

"Density-based Kernel" refers to a non-parametric way to estimate the probability density function of a random variable.

"Byte Stream" is a term used to represent a computing technique that allows for sending data in the size of eight bits, known as a byte, along a particular path.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Figure 1:
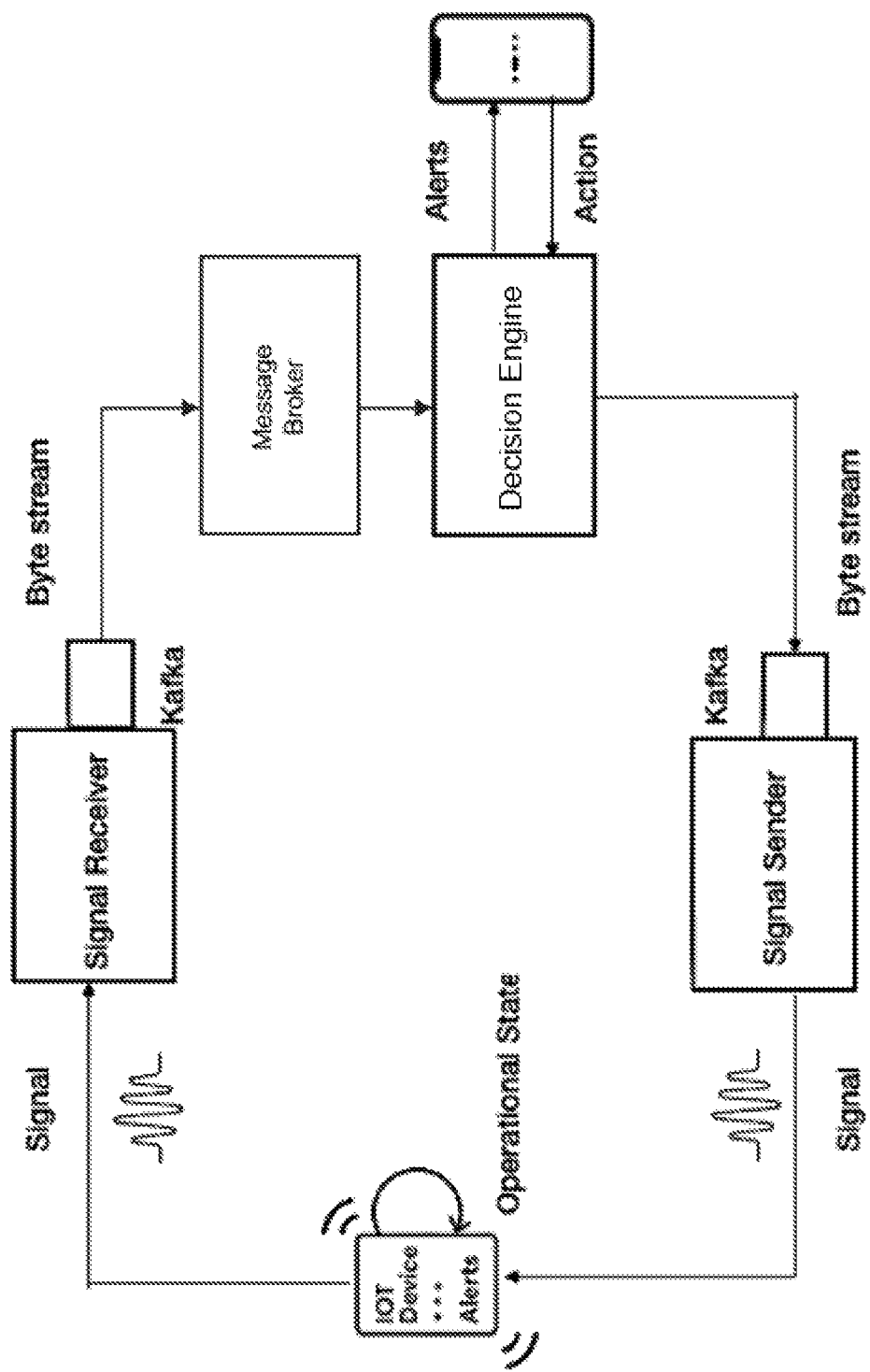
FIG. 1 shows workflow of the automatic insight curation and alerting system.

FIG. 1 details the workflow of the present invention's automatic insight curation and alerting system. Specifically, the input signals, coming in the form of time series from smart IoT devices, are normalized through density-based kernels. The data processing steps are executed at the signal receiver end. Normalized data then is passed through an ensemble of unsupervised machine learning algorithms in the decision engine. The decision engine is made of a range of machine learning (ML) algorithms from basic signal-based algorithms, such as Holt-Winter™, ARIMAX™, and Kalman filter, to advanced deep-learning algorithms, such as autoencoder-decoder for forecasting. Using advanced statistical techniques, the decision engine computes the normal range for the behavior of the metric variable and flags any deviation from the normal range. The present invention also runs a root cause analyzer for identifying the root cause of anomalies and reports the root cause of anomalies with supporting information.

The present invention detects anomalies in a stream of data generated from the internet of things (IoT) such as sensors, actuators, and other connected smart devices. The present invention can analyze signals received from various sensors that periodically generate signals in real-time.

The signal receiver receives a real-time signal from IoT sensors, which the signal receiver directs to a distributed data store. Further, the signal receiver encodes the signals into a byte stream to send the byte stream as a Kafka™ message to a Kafka™ cluster.

A message broker, such as a Kafka™ cluster, continuously monitors streaming data from various signal receiver modules as messages and stores the messages in a distributed manner across the cluster. The messages are partitioned such that a failure in one of the nodes in the cluster does not impact the storage and retrieval of the data. Thus, the message broker provides a reliable distributed message storage, retrieval, and brokering system for streaming data.

A decision engine reads the data from the message broker in real time and processes them to curate insights from the data. The decision engine detects anomalous behavior with the help of an anomaly detection module consisting of series of unsupervised machine learning algorithms and generates actionable insights which are then sent in the form of alerts to users.

Figure 2:
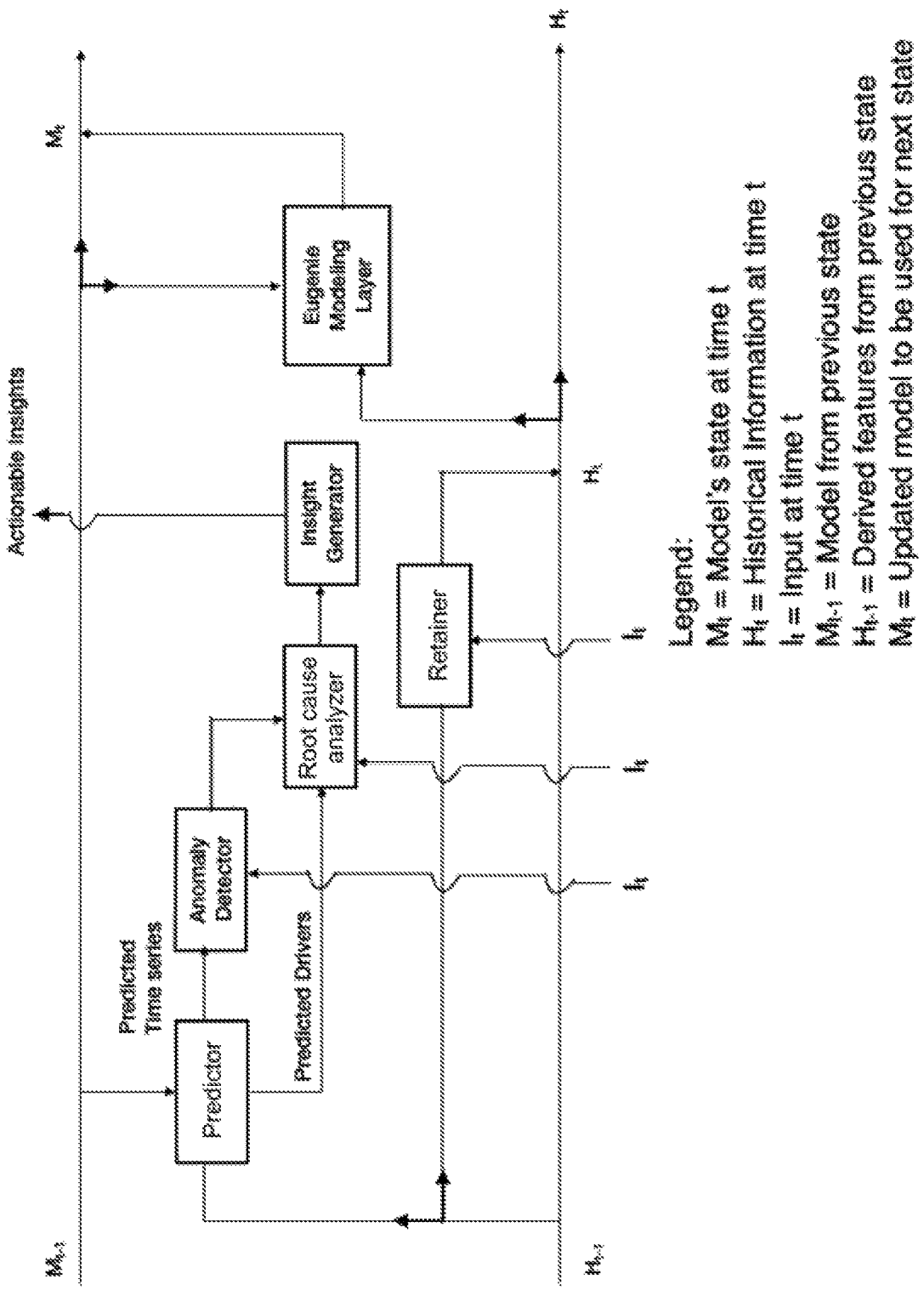
FIG. 2 details series of transformations applied to the input data batches.

The anomaly detection module fetches the current data stream from the persistent message broker/staging database. This operation occurs in a micro batched manner with time/frequency windows. In this windowing operation, the streaming data is organized into windows of time-periods, e.g., all the signals from past one minute (for an example) will be collected in a time series or windows of data frequency, e.g., a batch of 1000 data points are assembled in one window, which is then processed. A windowing operation creates essential units of time series for learning patterns in the data. The resulting stream of data is processed through a series of functional transformations as shown in FIG. 2 via machine learning algorithms that detect anomalies in the data. The functional transformations may split the stream into multiple streams and/or may join multiple streams into one stream by using a join operation.

FIG. 2 depicts series of transformations that may be applied to the input data batches. The predictor takes the derived feature from previous state $H_{t-1}$, and the model from previous state $M_{t-1}$, to predict the future values of the metrics based on the historical patterns. The outcome of this prediction step are two time series, the predicted time series P1 and the predicted drivers P2. The input $I_t$ is compared against the predicted time series P1 by the anomaly detector module to find and flag the anomalous behavior. The root cause analyzer examines the flagged anomalies by using the predicted drivers P2 and input $I_t$. The resulting numerical assessment is transformed into actionable insights into the insight generator module. At the same time, the retainer updates the derived features $H_{t-1}$ with the new data $I_t$ from the current state to be used as input for updating the model. The modelling layer enhances the model from the previous step $M_{t-1}$ by processing $H_t$. The above steps are repeated for each windowed batch operation.

An insight generator generates actionable insights based on the output of the outlier module and the root cause analyzer. Based on these, the decision engine recommends actions. These action recommendations are then passed to either human agents via the user-interface of the present invention and/or forwarded to the downstream signal for performing specific actions (e.g., on/off a sensor, etc.) with an IoT device.

Commands from the decision engine are sent as a Kafka™ message to the signal sender module. This module then decodes the Kafka™ message into an appropriate signal that can be understood by the IoT device and updates the operational state of the device.

After the present invention detects an anomaly which can be impactful for business, the anomaly is converted in an alert and sent to users for action as shown in FIG. 1. The present invention uses domain-specific rules to convert an anomaly to an actionable insight which can be consumed via domain experts or a machine.

Similar to the way the present invention interprets anomalies to insights, the present invention further converts insights to an action (e.g., stopping the operation of a device, etc.) to perform preventive maintenance for IoT devices. A signal sender, in such a case, acts as an interpreter between the insights and machine interpretable signals. After the signal is interpreted, the signal sender relays the interpreted signal to the hardware stack.

Figure 3:
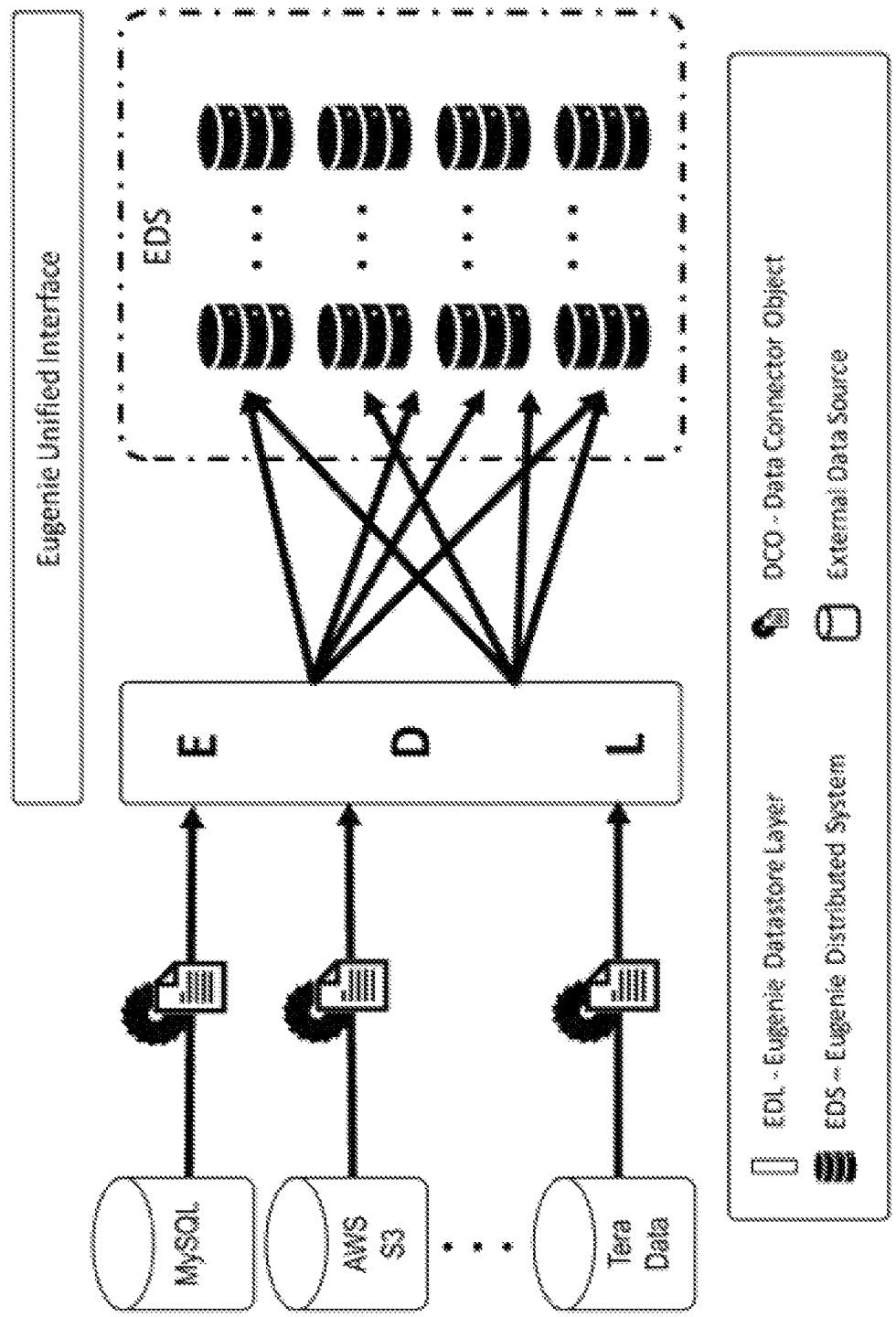
FIG. 3 depicts the information architecture comprising Eugenie Datastore Layer (EDL) and Eugenie Distributed System (EDS).

FIG. 3 depicts the information architecture of the present invention. It is crucially important for the present system to consume data from various sources in a scalable and efficient manner. This is achieved by the Eugenie™ Datastore Layer (EDL) which can interface with cloud based datastores such as Azure Storage™, AWS S3™, Google Cloud Storage™; traditional relational databases such as MySQL™, Postgres™, OracleDB™; modern NoSQL™ databases (aka "not only SQL", a database that store data differently than relational tables) such as Cassandra™ MongoDB™, CouchDB™; and enterprise grade solutions such as Teradata™. The EDL is designed to run as a microservice with the sole responsibility of consuming data and passing the data for further processing to Eugenie™ Distributed System (EDS). Moreover, EDL is written for a containerized runtime environment, making it platform agnostic, i.e., it can run on various cloud platforms, a data center that includes the present invention's data center, or can be deployed on-premise. This allows EDL to scale both horizontally across multiple machines as well as vertically on a single machine with multiple instances.

Figure 4:
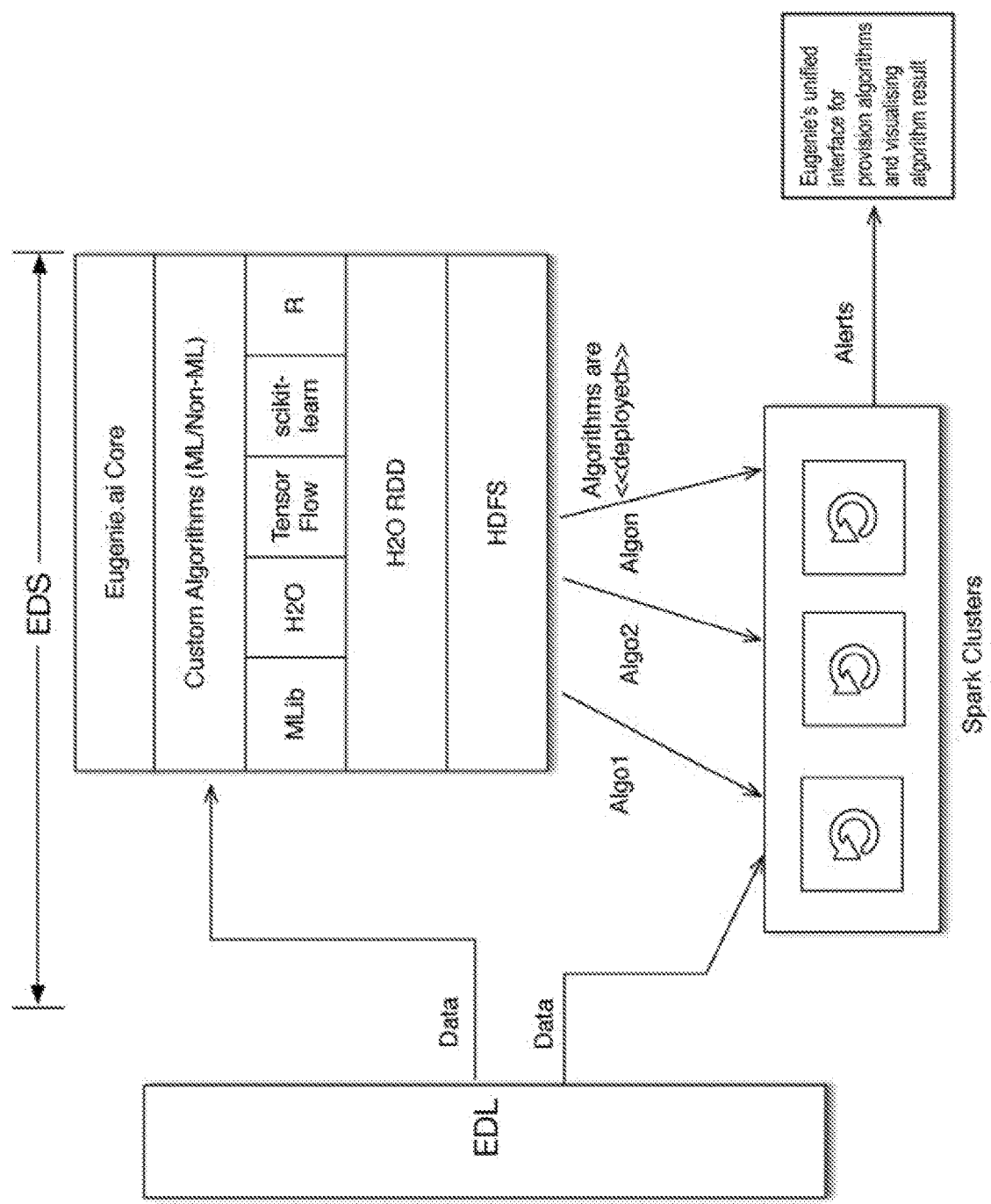
FIG. 4 shows the functional architecture of Eugenie Distributed System (EDS).

FIG. 4 depicts the functional architecture of Eugenie™ Distributed System (EDS) focusing on the various components of EDS. The custom algorithms developed specifically for the time series domain are at the core of the present invention. Additionally, various machine learning algorithms are implemented using MLlib™, H2O™, R™, TensorFlow™, and Scikit-Learn™. EDS is built on top of an Apache Hadoop™ Distributed Filesystem (HDFS) and uses Apache Spark™ to process the data in memory using Resilient Distributed Datasets (RDD). The Eugenie™ Unified Interface (EUL) enables users to provision algorithms, shows the status of the jobs and provides a visualization of resulting insights.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

EXAMPLES

Example 1. Usage of the Automated Anomaly Detection and Alerting System in a Network of Thermostat Sensors for Temperature Control A factory floor has many manufacturing equipment each having a smart thermostat device which may contain a plurality of temperature sensors. The thermostat periodically reads the temperature of the equipment and can report the temperature to the external automated anomaly detection and alerting system. The smart thermostat can also receive specific signals and change the operational state of the equipment. For example, if the temperature reading from the thermostat spikes to an abnormal range, the operational state of the equipment needs to be changed from functional to a suspended state to avoid damage to the equipment. The present invention's real-time anomaly detection and decision engine can automate this process as described in this use case.

Figure 5:
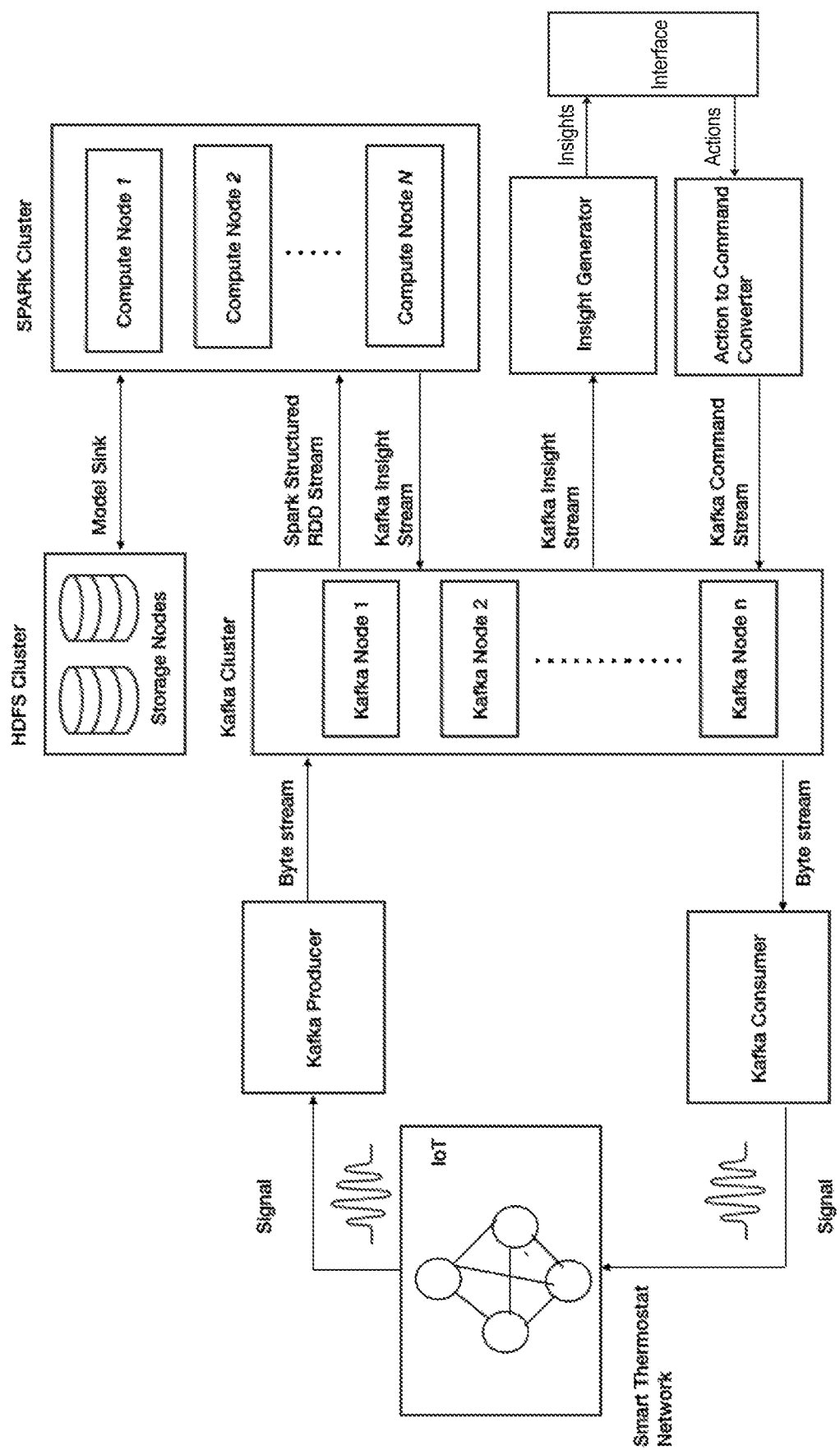
FIG. 5 depicts the usage of the automated anomaly detection and alerting system in a network of thermostat sensors for temperature control.

FIG. 5 depicts the workflow of the use of the present invention, an automated anomaly detection and alerting system, in a network of thermostat sensors for temperature control. The thermostat periodically reports the temperature reading every second to the present invention's signal receiver via the Apache Kafka™ (a.k.a., kafka) producer module. The Apache Kafka™ producer module encodes the reported temperature in a byte stream and associates metadata, such as equipment ID, floor number, etc., and transforms raw bits into understandable signals attached with meta data and sends the data to the message broker, a Kafka™ cluster, in this example. The specific protocol used by the smart thermostat device to communicate with the Kafka cluster is usually function of the hardware vendor and on-the-ground existing systems. An example of the standardized protocol used by the industry is Zigbee™.

Figure 6:
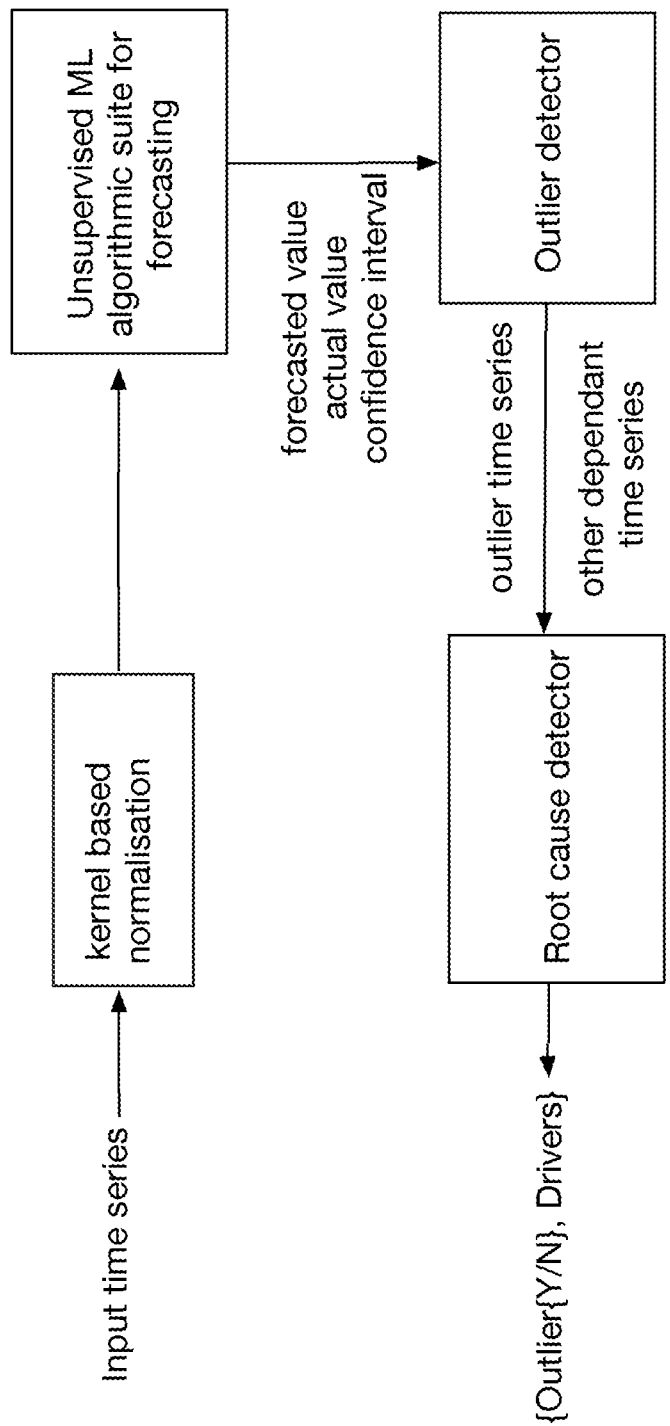
FIG. 6 depicts an ensemble of multiple unsupervised algorithms in the present invention.

A continuously running process on the Apache Spark™ cluster in the present invention's decision engine reads the Kafka™ stream and processes the Kafka™ stream in a windowed batch operation to detect anomalous behaviour and to flag any detected anomalies. FIG. 6 depicts the details of the workflow to detect anomalies by the present invention. The signal receiver performs kernel-based normalization to normalize data that is coming from IoT sensors in this case from a thermostat. It uses smoothing techniques such as Gaussian Kernel to get rid of any fluctuation in the data. Post smoothing data goes through the decision engine's anomaly detection module, which uses machine learning algorithms (from basic signal-based algorithms such as Holt-Winter™ ARIMAX™ to advanced deep-learning algorithms such as Kalman filter and encoder decoder, etc.) on the data to learn the pattern from it. Based on the learned pattern, the decision engine then forecasts the target key performance indicator (KPI) value for the future. If current temperature reading from the thermostat and the forecasted value for the same time frame is not in sync, i.e., the current actual value resides beyond the predicted value and the range, the anomaly detector or outlier detector annotates the current temperature as an outlier point and alerts accordingly. The present invention automatically determines the best algorithms given the input data and its distribution and automatically determines the forecasted value and the predicted interval given the chosen algorithm furthering it.

The present invention examines the detected anomalies for a matching rule in the decision engine to convert the detected anomalies into actionable insights. The actionable insights are translated into the appropriate signals by the Kafka™ consumer and sent to the thermostat device. On receiving the signal, the operational state of the equipment changes as per the pre-defined rules in the decision engine. Automatic change in the equipment mode of operation will lead to better utilization of the equipment and reduce wear and tear of the equipment.

Example 2. Usage of the Automated Anomaly Detection and Alerting System in Smart Hydraulics Powered Factory Product Processing Lines The second example for the use of the automated anomaly detection and alerting system is in a factory environment where the factory floor instruments are equipped with smart sensors, for example, a factory product processing line that packages manufactured units into a box of Stock Keeping Units (SKUs). In this example, the present invention's real time anomaly detection in the product processing line and automatically sending actionable insight to the factory floor engineer avoid faulty product processing.

Specifically, a series of smart hydraulics motors (i.e. a motor whose hydraulics machinery has sensors) process the product pipeline through a series of transformations to generate a shippable box of SKUs. All the motors in the pipeline need to work in a synchronized manner to avoid faults in the processing line causing invalid generation of SKU boxes. Over a period of time, some of the hydraulic powered motors go out of sync due to abnormal change in the pressure of the liquid in the hydraulic system. The smart hydraulics motors have sensors that continuously monitor the pressure of the liquid in the motor and send the pressure readings to the present invention's anomaly detector. As described in the thermostat use case, the present invention detects anomalies in this stream of data. When detected, it performs root cause analysis by correlating the pressure reading with other sensor data from the rest of the system. The factory floor engineer is presented with the detected anomalies, root cause analysis, and a matching recommendation as an actionable insight. The factory floor engineer can then execute a complex product line synchronization operation that may involve pausing and/or stopping one or more processing lines.

The impact of use of the present invention in the smart hydraulics powered factory product processing lines is that the time to action is expected to be reduced by an order of magnitude. The immediate action by the factory floor manager will lead to smooth functioning of the factory product line.

Example 3. Usage of the Automated Anomaly Detection and Alerting System in Businesses to Spot, Explore, and Exploit (S.E.E.) Anomalies and Patterns in Data that have an Impact The present invention enables businesses to Spot, Explore, and Exploit (S.E.E.) anomalies and patterns in data that have an impact. The present invention scans through vast amounts of data at scale and stitches the patterns together to generate actionable insights for businesses.

The present invention performs this Spot, Explore, and Exploit framework with the help of different algorithmic functional blocks.

The present invention also includes a Hotspot identifier. The Hotspot identifier finds the most critical areas of the business by highlighting the products or business units which have the most bottom-line impact. The Hotspot identifier compares the product or business unit against its peers as well as its past performance and gives a comprehensive picture of business areas that are growing exceptionally well or declining abruptly.

The present invention is contemplated to include a Breakout detector. The Breakout detector detects the trend setting moments in businesses and generates an alert. This alert would help business to understand why the business has changed its course and has reached an all time low or high unexpectedly.

The present invention also may include an outlier detector, which anomalies (items, events or observations that do not conform to an expected pattern or other items) in the dataset. It is contemplated that the outlier detector may help business make tactical decisions and to take corrective actions to mitigate risks arising due to business anomalies.

The present invention may include an Early Warning detector that detects areas of the business that will not meet the target outcomes.

Still further, the present invention may include a Mix Changes detector that detects significant changes in the business mix signaling underlying change in business dynamics.

Next, via a Pareto alert generator, the present invention may generate Pareto alerts after detecting significant changes in the concentration of the business.

In addition, via a Milestone identifier, the present invention may be capable of identifying important milestones such as new highs/lows in the business.

Furthermore, the present invention may include a trend reversal detector that detects changes in trends on critical business metrics.

While not exhaustive of all of the elements that may be included, the present invention may include a non-occurrence detector that detects unexpected null value in business data. The non-occurrence detector is contemplated to help determine why business is not as usual.

Behind the scenes, the present invention runs an ensemble of multiple unsupervised algorithms as depicted in FIG. 6. First, the input time series is normalized through state-of-the-art density-based kernels and then passed through an ensemble of unsupervised machine learning algorithms (from basic signal-based algorithms such as Holt-Winter™, ARIMAX™ to advanced deep-learning algorithms such as Kalman filter and autoencoder decoder, etc.) for forecasting. Using advanced statistical techniques, the present invention figures out the confidence interval of the metric variable and detects outliers. Moreover, the present invention runs a driver analysis module for identifying the root cause of anomalies and reports the same with supporting information.

The invention claimed is:
1. An automated insight curation and alerting system, comprising:
a computer network comprising at least one Internet of Things (IoT) device and at least one non-transitory computer-readable medium storing instructions that, when executed, enable the computer network to automatically generate insight curation and alerting, wherein the instructions comprises:
a signal receiver configured to receive a real-time input signal from Internet of Things (IoT) sensors and normalize the real-time input signal into a byte stream;

a message broker configured to continuously receive the byte stream from the signal receiver and store the byte stream in a distributed manner;

a decision engine configured to read the byte stream from the message broker in real time, the decision engine comprising an anomaly detection module to detect anomalies in the byte stream and to generate insights;

a signal sender configured to interpret the insights to a machine interpretable signal and relay the machine interpretable signal to a hardware stack; and wherein the anomaly detection module is configured to fetch the byte stream using windows, thereby generating a chunked signal, wherein the chunked signal is processed through a series of functional transformations via machine learning algorithms, wherein the functional transformations are implemented by a predictor, an anomaly detector, a root cause analyzer, an insight generator, a retainer and a modeling layer, wherein the predictor is configured to generate a predicted time series and a predicted driver based on historical patterns, wherein the predicted driver is a time series, wherein the anomaly detector is configured to find and flag the anomalies to generate a flagged anomaly signal by using the predicted time series and the input signal, and wherein the root cause analyzer is configured to generate a numerical assessment by using the predicted driver, the input signal and the flagged anomaly signal as input.

2. The system of claim 1, wherein the anomaly detection module comprises unsupervised machine learning algorithms.

3. The system of claim 1, wherein the windows comprise windows of time-periods and windows of data frequency.

4. The system of claim 1, wherein the predictor is configured to take a derived feature of historical information from a previous state and a model from a previous state to predict future values of metrics based on historical patterns.

5. The system of claim 1, wherein the input signal is compared against the predicted time series by the anomaly detector to find and flag the anomalies, thereby generating the flagged anomaly signal.

6. The system of claim 1, wherein the insight generator transforms the numerical assessment into insights.

7. The system of claim 4, wherein the retainer updates derived features with the input signal from a current state to be used as an input for updating the model from the previous state.

8. The system of claim 4, wherein a modelling layer enhances the model from the previous state by processing current state historical information.

9. The system of claim 1, wherein the decision engine further converts insights to an action to perform preventive maintenance for IoT devices.

10. The system of claim 1, wherein the computer network comprises a datastore layer and a distributed system, wherein the datastore layer is configured to run as a microservice for consuming the input signal and passing the input signal for further processing to the distributed system; and wherein the distributed system is built on top of open-source software utilities that facilitate using a computer network to solve problems involving massive amounts of data and computation and uses an open-source distributed general-purpose cluster-computing framework to process the signal.

11. A method for automated insight curation and alerting implemented by a computer network comprising instructions that, when executed, enable the computer network to automatically generate insight curation and alerting, comprising receiving, via a signal receiver, an input signal in the form of time series from IoT devices;

normalizing, via the signal receiver, the input signal through density-based kernels to generate a byte stream;

passing, from the signal receiver, the byte stream to a message broker to store the byte stream in a distributed manner;

passing, from the message broker, the byte stream to a decision engine comprising machine learning algorithms for forecasting;

computing, via the decision engine, a normal range for behaviors of the byte stream;

detecting, via the decision engine, anomalies in the byte stream;

generating, via the decision engine, insight signals; and reporting, via a signal sender, the insight signals with supporting information;

wherein the decision engine comprises an anomaly detection module to detect anomalies in the byte stream, wherein the anomaly detection module is configured to fetch the byte stream using windows, thereby generating a chunked signal, wherein the chunked signal is processed through a series of functional transformations via machine learning algorithms, wherein the functional transformations are implemented by a predictor, an anomaly detector, a root cause analyzer, an insight generator, a retainer and a modeling layer, wherein the predictor is configured to generate a predicted time series and a predicted driver based on historical patterns, wherein the predicted driver is a time series, wherein the anomaly detector is configured to find and flag the anomalies to generate a flagged anomaly signal, and wherein the root cause analyzer is configured to generate a numerical assessment by using the predicted driver, the input signal and the flagged anomaly signal as input.

12. The method of claim 11 further comprising predicting, via the predictor, future values of metrics based on historical patterns derived from a previous state and a model from a previous state.

13. The method of claim 11 further comprising fetching, via the anomaly detector, the byte stream in a batched manner using at least one of time windows and frequency windows.

14. The method of claim 13 further comprising chunking the byte stream in a batched manner using the time windows or the frequency windows to create the chunked signal.

15. The method of claim 12 further comprising comparing, via the anomaly detector, the input signal against the predicted time series to find and flag anomalies.

16. The method of claim 11 further comprising transforming, via the insight generator, the numerical assessment into insights.

17. The method of claim 11 further comprising updating, via the retainer, derived features with the input signal from a current state to be used as input for updating a model.

18. The method of claim 11 further comprising enhancing, via the modelling layer, a model from a previous state by processing current state historical information.

19. A method for enabling businesses to spot, explore, and exploit anomalies and patterns in a dataset implemented by a computer network comprising instructions that, when executed, enable the computer network to automatically generate insight curation and alerting, comprising:
receiving, via a signal receiver, an input signal in the form of time series from IoT devices;
normalizing, via the signal receiver, the input signal through density-based kernels to generate a byte stream;
passing, from the signal receiver, the byte stream to a message broker to store the byte stream in a distributed manner;
passing, from the message broker, the byte stream to a decision engine comprising machine learning algorithms;
computing, via the decision engine, a normal range for behaviors of the byte stream;
detecting, via a hotspot identifier in the decision engine, business areas that are growing or declining by highlighting products or business units which have an impact by comparing the product or business unit against its peers as well as its past performance;
detecting, via a breakout detector in the decision engine, a trend setting moments in businesses and generating an alert;
detecting, via an outlier detector in the decision engine, anomalies in the dataset;
detecting, via an early warning detector in the decision engine areas of the business that do not meet target outcomes;
detecting, via a mix changes detector in the decision engine, changes in a business mix signalling an underlying change in business dynamics;
generating, via a pareto alert generator in the decision engine, pareto alerts after detecting changes in a business mix;
identifying, via a milestone identifier, milestones;
detecting, via a trend reversal detector in the decision engine, changes in trends on critical business metrics; and
detecting, via a non-occurrence detector in the decision engine, null value in the dataset;
reporting, via a signal sender, insight signals with supporting information;
wherein the anomalies comprise items, events and observations that do not conform to an expected pattern or other items;
wherein the decision engine comprises an anomaly detection module to detect anomalies in the byte stream,
wherein the anomaly detection module is configured to fetch the byte stream using windows, thereby generating a chunked signal,
wherein the chunked signal is processed through a series of functional transformations via machine learning algorithms,
wherein the functional transformations are implemented by a predictor, an anomaly detector, a root cause analyzer, an insight generator, a retainer and a modeling layer,
wherein the predictor is configured to generate a predicted time series and a predicted driver based on historical patterns, wherein the predicted driver is a time series,
wherein the anomaly detector is configured to find and flag the anomalies to generate a flagged anomaly signal, and
wherein the root cause analyzer is configured to generate a numerical assessment by using the predicted driver, the input signal and the flagged anomaly signal as input.

* * * * *